(12) United States Patent
Sone et al.

(10) Patent No.: US 10,457,227 B2
(45) Date of Patent: Oct. 29, 2019

(54) WIRING STRUCTURE

(71) Applicants: AutoNetworks Technologies, Ltd., Yokkaichi, Mie (JP); Sumitomo Wiring Systems, Ltd., Yokkaichi, Mie (JP); Sumitomo Electric Industries, Ltd., Osaka (JP)

(72) Inventors: Kosuke Sone, Mie (JP); Kazuyoshi Ohara, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-Shi, Osaka (JP)

( * ) Notice: Subject to any disclaimer, the term of this patent is extended or adjusted under 35 U.S.C. 154(b) by 0 days.

(21) Appl. No.: 16/075,427

(22) PCT Filed: Jan. 31, 2017

(86) PCT No.: PCT/JP2017/003290
§ 371 (c)(1),
(2) Date: Aug. 3, 2018

(87) PCT Pub. No.: WO2017/141683
PCT Pub. Date: Aug. 24, 2017

(65) Prior Publication Data
US 2019/0047489 A1 Feb. 14, 2019

(30) Foreign Application Priority Data
Feb. 19, 2016 (JP) .................................. 2016-029487

(51) Int. Cl.
*H01R 13/46* (2006.01)
*B60R 16/02* (2006.01)
(Continued)

(52) U.S. Cl.
CPC ......... *B60R 16/0207* (2013.01); *H01R 13/56* (2013.01); *H02G 3/04* (2013.01);
(Continued)

(58) Field of Classification Search
USPC ....................................................... 172/72 A
See application file for complete search history.

(56) References Cited

U.S. PATENT DOCUMENTS 3,794,960 A * 2/1974 Sugar ................. H01R 13/5804
439/459
3,803,530 A * 4/1974 Lapraik ................ H01R 13/516
439/892
(Continued)

FOREIGN PATENT DOCUMENTS

JP S64-20686 U1 2/1989
JP H11-288774 A 10/1999
(Continued)

OTHER PUBLICATIONS

International Search Report in International Application No. PCT/JP2017/003290 dated Apr. 11, 2017.

*Primary Examiner* — William H. Mayo, III
*Assistant Examiner* — Krystal Robinson
(74) *Attorney, Agent, or Firm* — Honigman LLP

(57) ABSTRACT

Provided is a wiring structure that can manage a protruding length of a led-out portion of an electrical wire so as to be constant. The wiring structure includes: a wiring member that is made of resin and has a wiring surface; and an electrical wire that includes a portion routed along the wiring surface and a portion led out from the wiring surface, the portion led out having an end portion to which a connector is to be attached. A positioning/fixing portion is provided integrally with the wiring member at a position in the vicinity of a lead-out position on the wiring surface of
(Continued)

the wiring member, the electrical wire being led out from the lead-out position.

2 Claims, 7 Drawing Sheets

(51) Int. Cl.
*H01R 13/56* (2006.01)
*H02G 3/04* (2006.01)
*H02G 3/30* (2006.01)
*H01R 13/58* (2006.01)

(52) U.S. Cl.
CPC ............ *H02G 3/30* (2013.01); *B60R 16/0215* (2013.01); *H01R 13/5808* (2013.01); *H02G 3/0437* (2013.01)

(56) References Cited

U.S. PATENT DOCUMENTS

| | | | | | |
|---|---|---|---|---|---|
| 3,936,129 | A | * | 2/1976 | Guy | H01R 13/516 439/464 |
| 4,035,051 | A | * | 7/1977 | Guy | H01R 13/516 439/464 |
| 4,127,316 | A | * | 11/1978 | McKee | H01R 13/5808 439/468 |
| 4,163,598 | A | * | 8/1979 | Bianchi | H01R 13/6592 439/404 |
| 4,842,549 | A | * | 6/1989 | Asick | H01R 13/5837 439/455 |
| 5,126,507 | A | * | 6/1992 | Kirma | H05K 9/00 138/108 |
| 5,211,706 | A | * | 5/1993 | Polgar | H01R 13/506 439/464 |
| 5,792,995 | A | * | 8/1998 | Takeda | H02G 3/26 174/152 G |
| 6,210,178 | B1 | * | 4/2001 | DeForest, Jr. | H01R 12/721 439/76.1 |
| 6,383,014 | B1 | * | 5/2002 | Saito | B60R 16/0215 174/97 |
| 7,527,520 | B2 | * | 5/2009 | Nitobe | H01R 13/5812 439/464 |
| 9,150,115 | B2 | * | 10/2015 | Ikeda | H02G 3/0437 |
| 9,231,337 | B2 | * | 1/2016 | Sakakura | H01R 13/5804 |
| 2014/0080351 | A1 | * | 3/2014 | Kawakami | H01R 13/5804 439/464 |
| 2015/0266636 | A1 | * | 9/2015 | Zantout | B65D 63/1018 24/16 R |

FOREIGN PATENT DOCUMENTS

| | | |
|---|---|---|
| JP | 2004-201424 A | 7/2004 |
| JP | 2004-273369 A | 9/2004 |
| JP | 2011-216451 A | 10/2011 |
| JP | 2012-119241 A | 6/2012 |

* cited by examiner

WIRING STRUCTURE

CROSS-REFERENCE TO RELATED APPLICATIONS

This application is the U.S. national stage of PCT/JP2017/003290 filed Jan. 31, 2017, which claims priority of Japanese Patent Application No. JP 2016-029487 filed Feb. 19, 2016.

TECHNICAL FIELD

The present disclosure relates to a wiring structure.

BACKGROUND

A wiring structure disclosed in JP 2015-15849A includes a base member that is made of resin and is to be attached to a device. A gutter is provided in the upper surface of the base member. The gutter includes a bottom portion that supports trunk portions of electrical wires, and a pair of side portions that stand upright on two sides of the bottom portion and cover two sides of the trunk portions. Lead-out portions are openings in a side portion. Each electrical wire includes a branch portion that is bent from a trunk portion at a right angle and is led out from a lead-out portion, and a connector is connected to an end of each branch portion. The gutter is covered by a cover.

The trunk portions of the electrical wires are inserted into the gutter from above, and then the upper opening of the gutter is covered with the cover. Thus, the trunk portions are held within the gutter.

With the above-described conventional wiring structure, the cover can prevent the trunk portions of the electrical wires from coming out of the base member. However, the trunk portions may move in the gutter of the base member in the lengthwise direction, and thus it is difficult to manage the branch portions of the electrical wires led out of the lead-out portions so that each branch portion has a predetermined protruding length. Therefore, there is the possibility of the connectors not being located at appropriate positions at which fitting to partner connectors can be started, which hinders connector fitting work from being smooth.

The present disclosure has been completed in view of the above-described situation, and aims to provide a wiring structure that can manage led-out portions of electrical wires so that each led-out portion has a constant protruding length.

SUMMARY

A wiring structure according to the present disclosure includes: a wiring member that is made of resin and has a wiring surface; and an electrical wire that includes a portion routed along the wiring surface and a portion led out from the wiring member, the portion led out having an end portion to which a connector is to be attached, wherein a positioning/fixing portion is provided integrally with the wiring member at a position in the vicinity of a lead-out position on the wiring surface of the wiring member, the electrical wire being led out from the lead-out position, the wiring structure further comprises a band member that includes a band body portion that is wound around an outer circumferential surface of the electrical wire, and a base portion that has a lock hole through which the band body portion is inserted and that locks the band body portion, and the positioning/fixing portion has an insertion space that is located inside walls that stand upright on the wiring surface and into which the base portion is fitted, and has a coupling member holding piece that stands upright and extends in a top-bottom direction from the wiring surface side and that is bendable so as to pivot about the wiring surface side, and a standing end of the coupling member holding piece is provided with an anti-separation protrusion that is claw-shaped and protrudes toward the insertion space.

A positioning/fixing portion is provided integrally with the wiring member at a position in the vicinity of a lead-out position on the wiring surface of the wiring member, the electrical wire being led out from the lead-out position. Therefore, it is possible to prevent a portion of the electrical wire, the portion being routed along the wiring surface, from being displaced relative to the wiring surface. As a result, it is possible to manage the protruding length of the led-out portion of the electrical wire so as to be constant. Note that the positioning/fixing portion has a fixing force that is strong enough to prevent the electrical wire from being displaced relative to the wiring surface even when the electrical wire is pulled with a strong force. For example, if the wiring structure is situated in a high-temperature environment, there is a concern that the resin of the wiring member will thermally expand, which leads to a change in the dimensions of the positioning/fixing portion, and that the fixing force of the positioning/fixing portion that is strong enough to fix the coupling member will decrease. In this regard, with the above-described configuration, the anti-separation protrusion is located such that, after the coupling member holding piece bends, the anti-separation protrusion can be locked to an end surface of the coupling member. Therefore, it is possible to prevent the coupling member from coming out of the insertion space even if the fixing force of the positioning/fixing portion decreases.

DETAILED DESCRIPTION OF PREFERRED EMBODIMENTS

The following describes preferred embodiments of the present disclosure.

A wiring structure according to the present disclosure includes: a wiring member that is made of resin and has a wiring surface; and an electrical wire that includes a portion routed along the wiring surface and a portion led out from the wiring member, the portion led out having an end portion to which a connector is to be attached, wherein a positioning/fixing portion is provided integrally with the wiring member at a position in the vicinity of a lead-out position on the wiring surface of the wiring member, the electrical wire being led out from the lead-out position, and the positioning/fixing portion has an electrical wire winding portion that stands upright on the wiring surface, an insertion port through which the electrical wire is inserted toward the electrical wire winding portion, and an electrical wire holding piece that is bendable and from which a flange protrudes toward the insertion port First Embodiment The following describes a first embodiment with reference to FIGS. 1 to 9. A wiring structure according to the first embodiment illustrates a structure that is provided for a hydraulic control device for an automatic transmission of an automobile. The wiring structure includes: a wiring member 10 that is to be attached to the body (not shown) of the hydraulic control device; a plurality of electrical wires 60; and band members 80 that serve as coupling members for fixing the electrical wires 60 to the wiring member 10.

Figure 1:
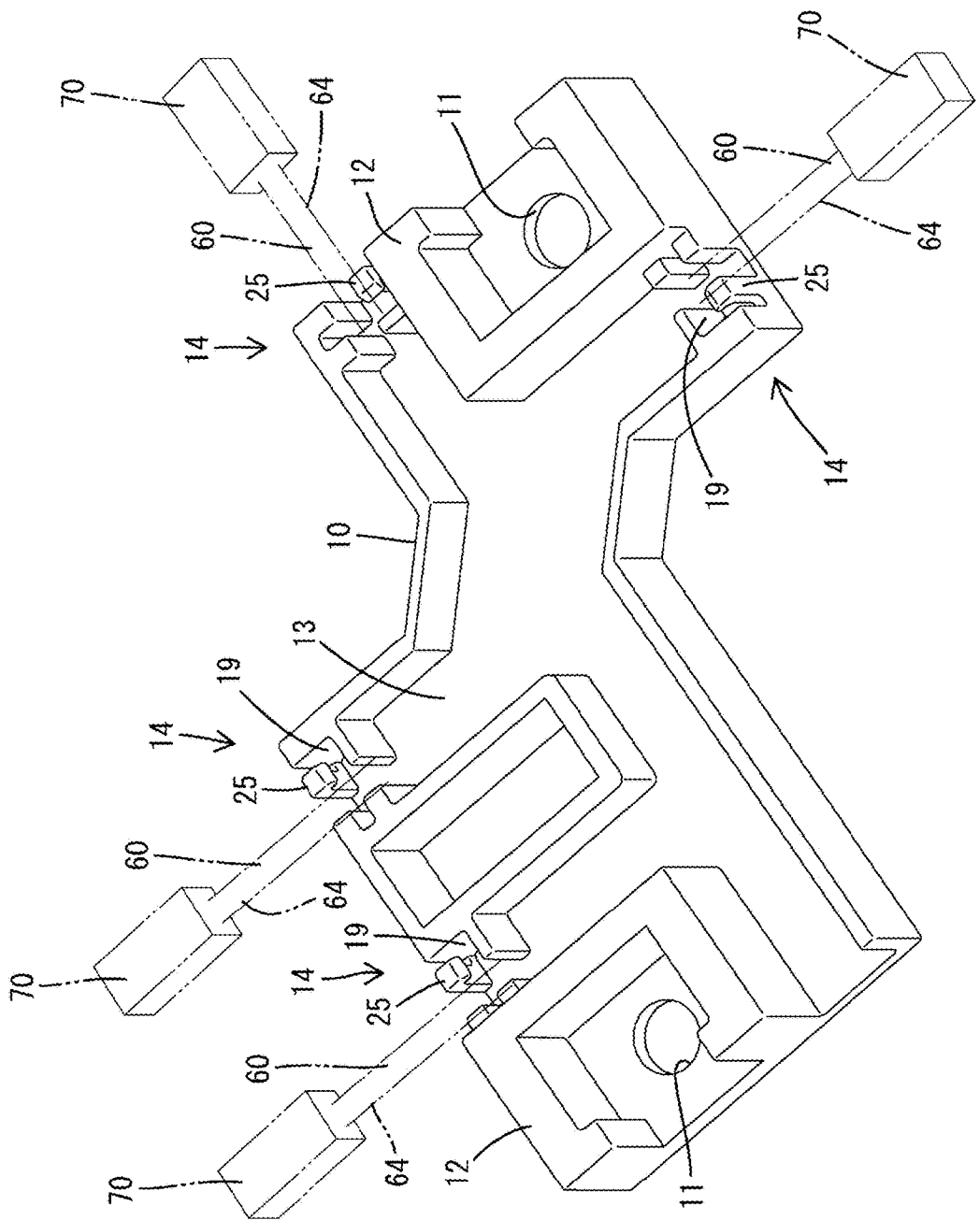
FIG. 1 is a perspective view of a wiring member in a wiring structure according to a first embodiment of the present disclosure.

As shown in FIG. 1, the wiring member 10 is made of a synthetic resin, and is formed so as to have a plate-like shape overall. Bolt insertion holes 11 into which bolts (not shown) for fixing the wiring member 10 to the body can be inserted are provided penetrating the wiring member 10 at appropriate positions, and an enclosure wall 12 is provided around each bolt insertion hole 11 so as to stand upright. A wiring surface 13 that is a flat surface extending in directions in which the electrical wires 60 are routed is provided on the upper side of the wiring member 10.

Positioning/fixing portions 14 for positioning and fixing the electrical wires 60 are respectively provided at a plurality of positions on the periphery of the wiring member 10 at intervals so as to be integrated with the wiring member 10. Each positioning/fixing portion 14 has walls that stand upright so as to be substantially orthogonal to the wiring surface 13 of the wiring member 10.

Figure 2:
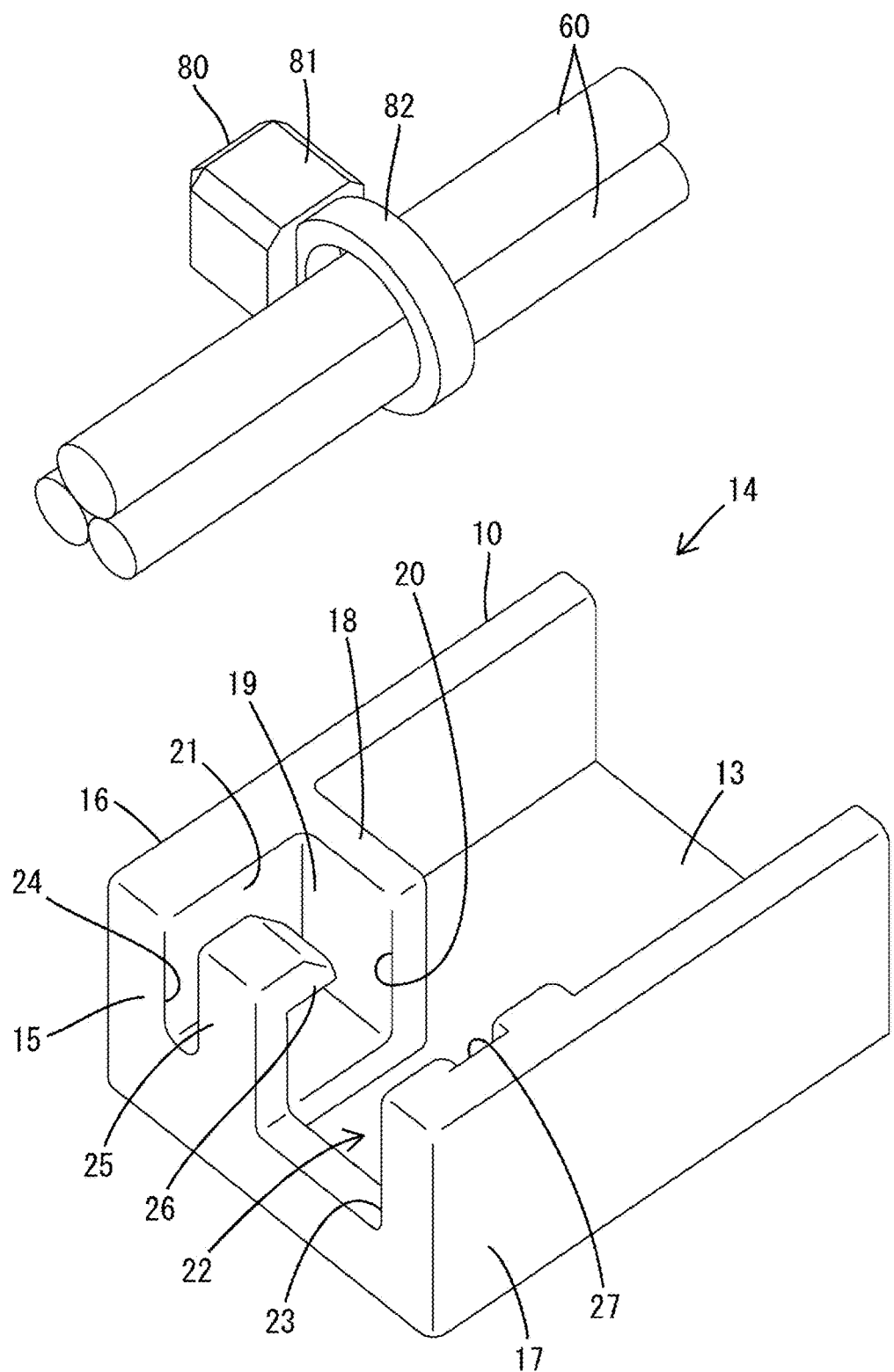
FIG. 2 is a perspective view of electrical wires with a band member attached thereto, and a positioning/fixing portion, which are separated from each other.
Figure 7:
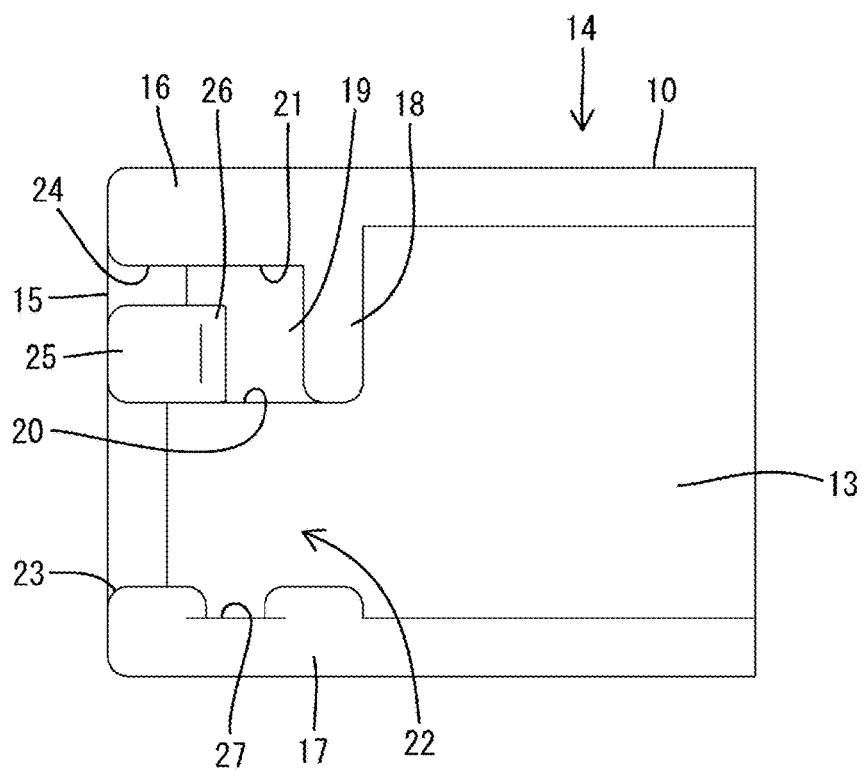
FIG. 7 is a plan view of the positioning/fixing portion.

As shown in FIGS. 2 and 7, the walls include: an end wall 15 that extends along an end edge of the wiring member 10; a pair of side walls 16 and 17 that extend in a direction that is substantially orthogonal to the wall surface of the end wall 15; and a back wall 18 that extends in a direction that is substantially orthogonal to the wall surfaces of the side walls 16 and 17. The back wall 18 is continuous with one side wall (hereinafter referred to as a "first side wall 16") out of the side walls 16 and 17, and is located so as to face the end wall 15. Note that the pairs of side walls 16 and 17 include a side wall that is integrated with an enclosure wall 12 and is thick and a side wall that is independently formed and is thin.

Figure 3:
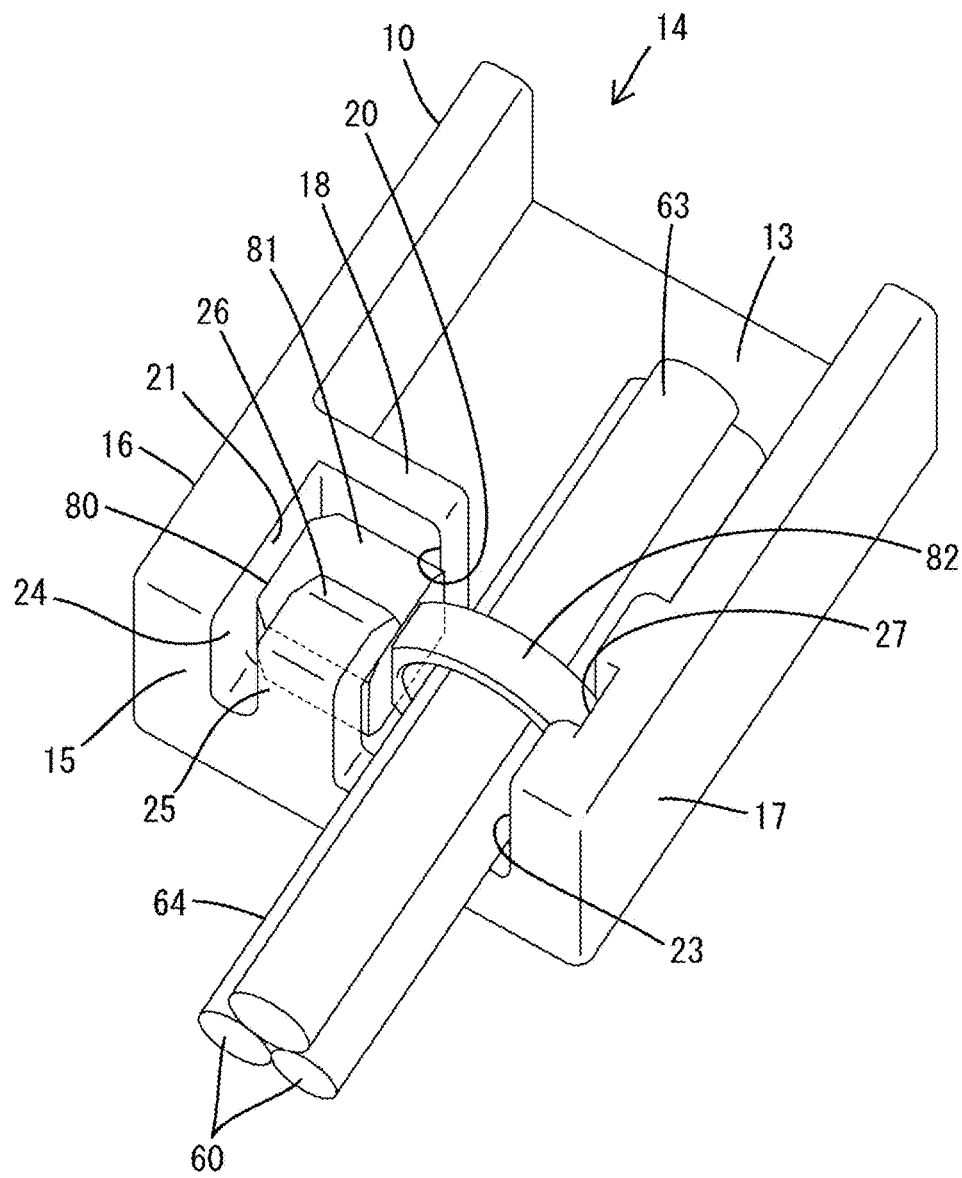
FIG. 3 is a perspective view showing a state in which electrical wires are positioned and fixed by the positioning/fixing portion, using the band member.
Figure 6:
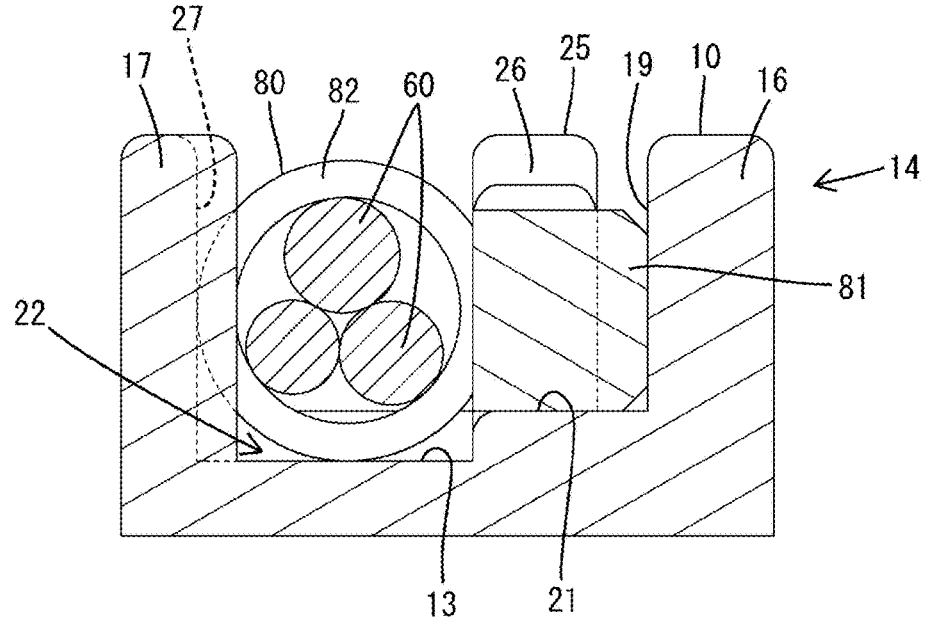
FIG. 6 is a cross-sectional view along a line B-B in FIG. 4.

A first side wall 16, an end wall 15, and a back wall 18, which stand upright on the wiring surface 13 of the wiring member 10, define a positioning recessed portion 19. Each positioning recessed portion 19 has an insertion space 21 that is open upward, and that is also open in a lateral side (hereinafter referred to as a "lateral side opening portion 20") located on the other side wall (hereinafter referred to as a "second side wall 17") side. As shown in FIGS. 2 and 3, a base portion 81, which will be described below, of a band member 80 is inserted into the insertion space 21 from above. Each positioning/fixing portion 14 has a wiring path 22 for electrical wires 60, between the positioning recessed portion 19 and the second side wall 17. The wiring path 22 is in communication with the lateral side opening portion 20 of the insertion space 21. As shown in FIG. 6, the wiring surface 13 of the wiring path 22 is provided a step below the bottom surface of the positioning recessed portion 19 (the insertion space 21).

Figure 8:
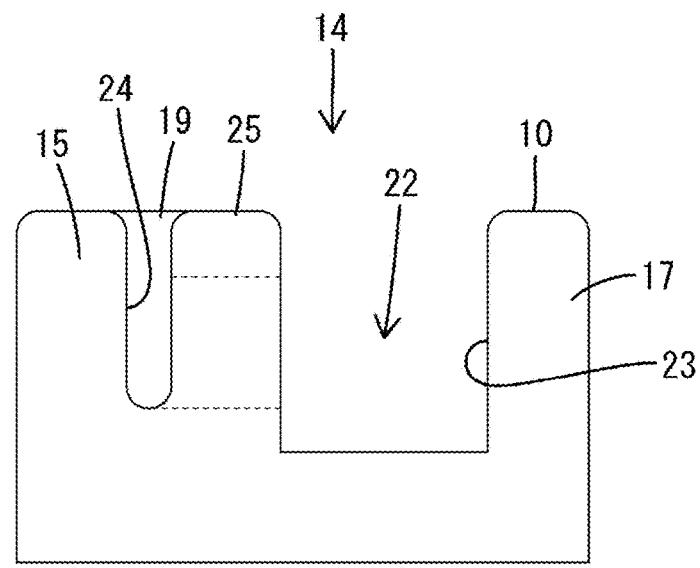
FIG. 8 is a front view of the positioning/fixing portion.
Figure 9:
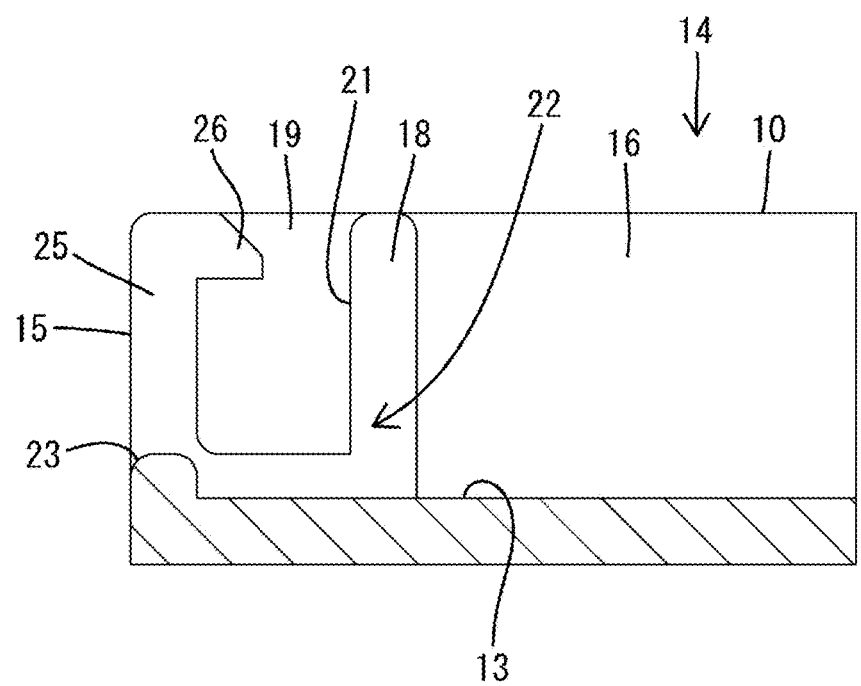
FIG. 9 is a cross-sectional view of the positioning/fixing portion along a wiring path.

Also, as shown in FIGS. 8 and 9, the end wall 15 has a lead-out port 23 at a position that is adjacent to the positioning recessed portion 19. The lead-out port 23 penetrates through the end wall 15 in a thickness direction so as to be in communication with the wiring path 22, and is open at the upper end of the end wall 15.

A slit 24 is formed as a cutout in the end wall 15 of the positioning recessed portion 19. The slit 24 extends in a top-bottom direction, and is open at the upper end of the end wall 15. The end wall 15 includes a coupling member holding piece 25 between the slit 24 and the lead-out port 23. The coupling member holding piece 25 extends in a top-bottom direction to constitute a wall surface of the end wall 15, and can bend by pivoting about the lower end thereof. An anti-separation protrusion 26 that has the shape of a claw protruding toward the insertion space 21 is provided at the upper end of the coupling member holding piece 25.

As shown in FIG. 7, a band insertion portion 27 is formed in the inner surface (the surface that faces the wiring path 22) of the second side wall 17 so as to be recessed, at a position opposite the lateral side opening portion 20 of the insertion space 21. The band insertion portion 27 extends in a top-bottom direction, and is open at the upper end of the second side wall 17. A band body portion 82, which will be described later, of a band member 80 is inserted into the band insertion portion 27 from above.

Each electrical wire 60 is formed as a coated electrical wire in which a core wire is enclosed by an insulating resin. A metal terminal part (not shown) is electrically and mechanically connected to each of the two ends of a set of electrical wires 60. A metal terminal part is inserted into and held by a connector 70. Therefore, the two ends of a set of electrical wires 60 are connected to connectors 70 via metal terminal parts. Each connector 70 is fitted to a partner connector (not shown) after the wiring member 10 has been fixed to the body. In the present embodiment, partner connectors are provided on a solenoid for hydraulic control (not shown), which is installed on the body.

Figure 4:
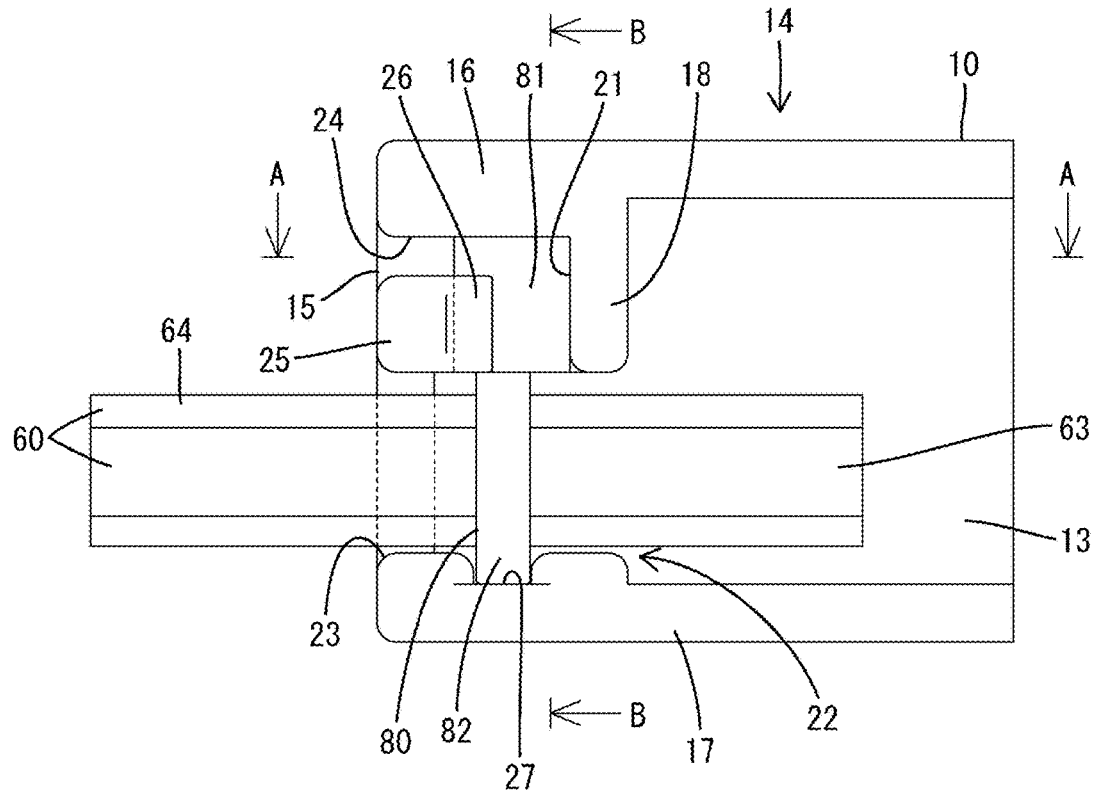
FIG. 4 is a plan view corresponding to FIG. 3.
Figure 5:
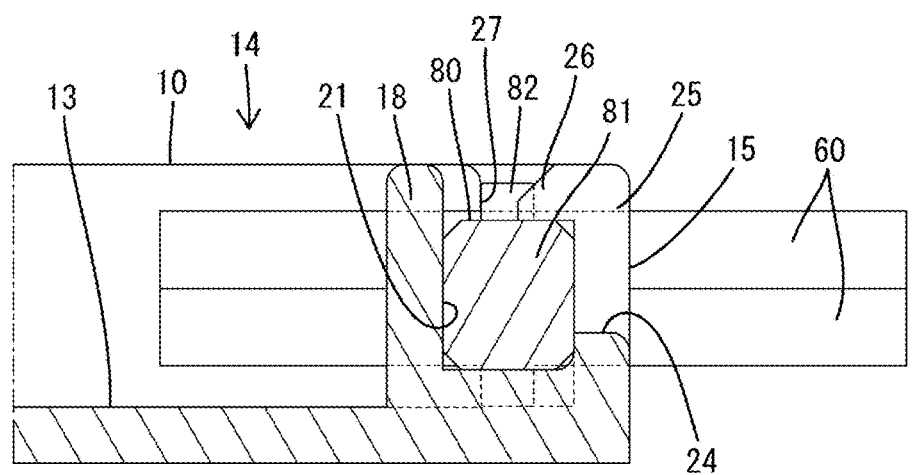
FIG. 5 is a cross-sectional view along a line A-A in FIG. 4.

As shown in FIGS. 3 and 4, each electrical wire 60 includes: a routing-target portion 63 that is routed along the wiring surface 13 of the wiring member 10; and a led-out portion 64 that is led out from a lead-out position of the wiring surface 13 (a position corresponding to a lead-out port 23). As shown in FIG. 1, the connectors 70 are connected to the ends of the led-out portions 64.

As shown in FIG. 2, each band member 80 is formed as a cable tie band (a so-called tie band) that ties a plurality of electrical wires 60 together. Each band member 80 is made of a synthetic resin, and includes a base portion 81 and a band body portion 82 that extends from the base portion 81.

The base portion 81 has the shape of a substantially rectangular block, and is configured to be fitted into the insertion space 21 of a positioning recessed portion 19 (see FIGS. 3 to 6). Also, the base portion 81 has a lock hole (not shown) into which the band body portion 82 can be inserted, and a lock protrusion (not shown) is formed on the hole surface of the lock hole.

The band body portion 82 is bendable and has a belt-like shape, and has a length that is long enough to surround the outer circumferential surface of a set of electrical wires 60. One surface of the band body portion 82 is provided with many ridge portions (not shown) that are successively arranged in the lengthwise direction. The band body portion 82 is wound around the outer circumferential surface of a set of electrical wires 60, the leading end of the band body portion 82 is inserted into the lock hole and is pulled, and ridge portions are locked to the lock protrusion in such a state. Thus, the band member 80 is wound around and fixed to the outer circumferential surfaces of the set of electrical wires 60 with a given fastening force. After the band member 80 has been wound, a redundant portion of the band body portion 82 protruding from the base portion 81 is cut off.

Here, the band member 80 is wound around sections of the routing-target portions 63 of the electrical wires 60, the sections being adjacent (close) to the led-out portions 64. Therefore, winding-target positions of the electrical wires 60, around which the band member 80 is to be wound, are in the vicinity of the boundary position between the routing-target portions 63 and the led-out portions 64 of the electrical wires 60, and, in a state where the routing-target portions 63 are routed on the wiring surface 13, the winding-target positions are in the vicinity of the lead-out position of the wiring surface 13 (inside positions near the lead-out port 23).

Next, the following describes how to attach the wiring structure according to the first embodiment.

First, the two ends of a set of electrical wires 60 are connected to connectors 70 via metal terminal parts. In this example, three electrical wires 60 are connected to one connector 70. Next, the band member 80 is wound around and fixed to the winding-target positions of the electrical wires 60. As a result, the base portion 81 of the band member 80 is located so as to laterally protrude from the electrical wires 60 (see FIG. 2).

Subsequently, the above-described electrical wires 60 to which the band member 80 is attached are lowered toward the wiring surface 13 of the wiring member 10 (see FIGS. 2 and 3). During the process in which the electrical wires 60 are lowered toward the wiring surface 13, the base portion 81 of the band member 80 is inserted into the insertion space 21 of the positioning recessed portion 19 from above, interferes with the anti-separation protrusion 26, and bends the coupling member holding piece 25 outward (in a direction away from the insertion space 21). Thereafter, when the electrical wires 60 are properly routed on the wiring surface 13, the base portion 81 of the band member 80 is entirely fitted into the insertion space 21 of the positioning recessed portion 19, and is sandwiched between the end wall 15 and the back wall 18 (see FIGS. 4 and 5). When the base portion 81 is fitted into the insertion space 21, the coupling member holding piece 25 elastically returns to the original shape thereof at the same time, and the anti-separation protrusion 26 is located on the base portion 81 so that the base portion 81 can be locked. As a result, the base portion 81 is prevented from coming out of the insertion space 21 in an upward direction.

Furthermore, when the base portion 81 is fitted into the insertion space 21, two side portions of the band body portion 82 in a radial direction are inserted into the lateral side opening portion 20 of the insertion space 21 and the band insertion portion 27, respectively. As a result of the base portion 81 of the band member 80 being fitted into the insertion space 21 and held by the walls of the positioning recessed portion 19, the electrical wires 60 to which the band member 80 are attached are positioned and fixed relative to the positioning/fixing portion 14. When the electrical wires 60 are thus fixed by the positioning/fixing portions 14, the routing-target portions 63 of the electrical wires 60 are routed along the predetermined wiring path 22, and the led-out portions 64 of the electrical wires 60 are led out of the lead-out port 23 so as to have a predetermined protruding length. In the first embodiment, the electrical wires 60 are fixed to the positioning/fixing portion 14 using the band member 80, and therefore the protruding length of the electrical wires 60 from the lead-out port 23 can be kept constant.

Next, the wiring member 10 with the electrical wires 60 fixed thereto is fixed to the body of the hydraulic control device using fixing bolts. At this time, since the led-out portions 64 of the electrical wires 60 are led out of the lead-out port 23 so as to have a predetermined protruding length, the connector 70 connected to the ends of the led-out portions 64 of the electrical wires 60 is located at a position at which the connector 70 directly faces, and can be fitted to, the partner connector corresponding thereto. Therefore, it is possible to thereafter smoothly and swiftly perform work to fit the connector 70 and the partner connector to each other.

Here, as a result of the wiring member 10 being built into the hydraulic control device and being exposed to a high-temperature environment, there is a concern that the resin of the wiring member 10 will thermally expand, which leads to a change in the dimensions thereof, and that the fixing force of the positioning/fixing portion 14 that fixes the band member 80 will decrease. However, in the first embodiment, even if the fixing force of the positioning/fixing portions 14 that fix the band members 80 decreases, the anti-separation protrusion 26 of the coupling member holding piece 25 abuts against the upper surface of the base portion 81, and prevents the band member 80 from coming out of the positioning/fixing portion 14.

As described above, according to the first embodiment, the positioning/fixing portion 14 for the electrical wires 60 is provided integrally with the wiring member 10 at a position in the vicinity of the lead-out position on the wiring surface 13 of the wiring member 10, the electrical wires 60 being led out from the lead-out position. Therefore, it is possible to prevent the routing-target portions 63 of the electrical wires 60 from being displaced relative to the wiring surface 13 of the wiring member 10. As a result, it is possible to manage the led-out portions 64 of the electrical wires 60 so that each led-out portion 64 has a constant protruding length.

Also, the band member 80, which serves as a coupling member, is fixed to the outer circumferential surfaces of the set of electrical wires 60, and the base portion 81 of the band member 80 is inserted into the insertion space 21 of the positioning recessed portion 19 from above. Thus, the electrical wires 60 can be easily attached to the positioning/fixing portion 14 using the band member 80. Also, it is easy to fix the electrical wires 60 by winding the band member 80 around the outer circumferential surfaces of the set of electrical wires 60. In addition to this, it is possible to use an existing tie band as the band member 80. If the band member 80 is a fastening member like a tie band that ties a plurality of electrical wires 60 together, the function of tying the electrical wires 60 together and the function of positioning and fixing the electrical wires 60 relative to the wiring surface 13 can be achieved by the band member 80 alone. Therefore, it is possible to reduce the number of parts compared to when the two functions (the function of tying the electrical wires 60 together and the function of positioning and fixing the electrical wires 60) are achieved by individual members.

Furthermore, since the positioning/fixing portion 14 has the coupling member holding piece 25 from which the anti-separation protrusion 26 protrudes toward the insertion port (the upper end opening) of the insertion space 21, and that is bendable, it is possible to prevent the base portion 81 from coming out of the insertion space 21 even when the wiring member 10 is exposed to a high-temperature environment.

Note that, unlike in the first embodiment, if a pair of coupling member holding pieces are provided for each positioning/fixing portion 14, the structure is complex, and, in addition, there is a concern that both coupling member holding pieces will bend, and the base portion 81 will be inclined. In this regard, in the first embodiment, only one coupling member holding piece 25 is provided for each positioning/fixing portion 14. Therefore, the base portion 81 is stably held between the coupling member holding piece 25 and the back wall portion 18, and a situation in which the base portion 81 is inclined, for example, can be avoided.

Second Embodiment

Figure 10:
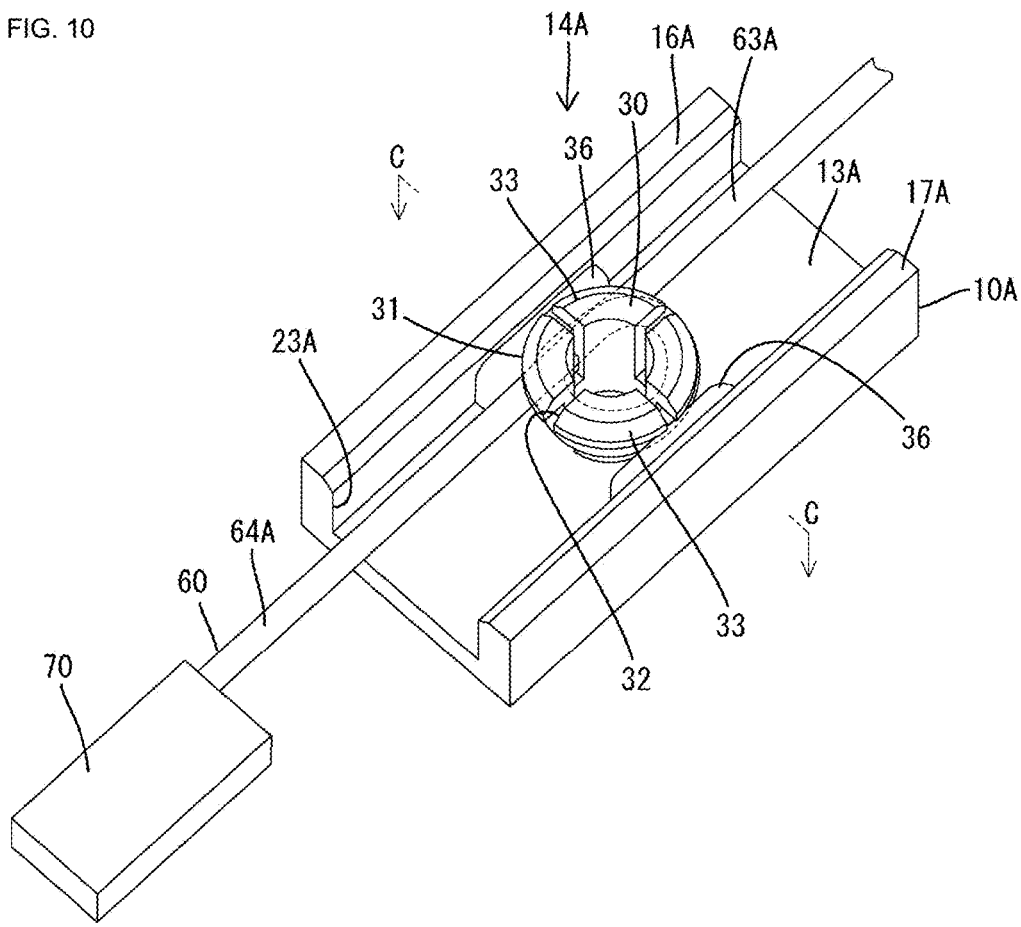
FIG. 10 is a perspective view showing a state in which electrical wires are positioned and fixed by a positioning/fixing portion in a wiring structure according to a second embodiment of the present disclosure.
Figure 11:
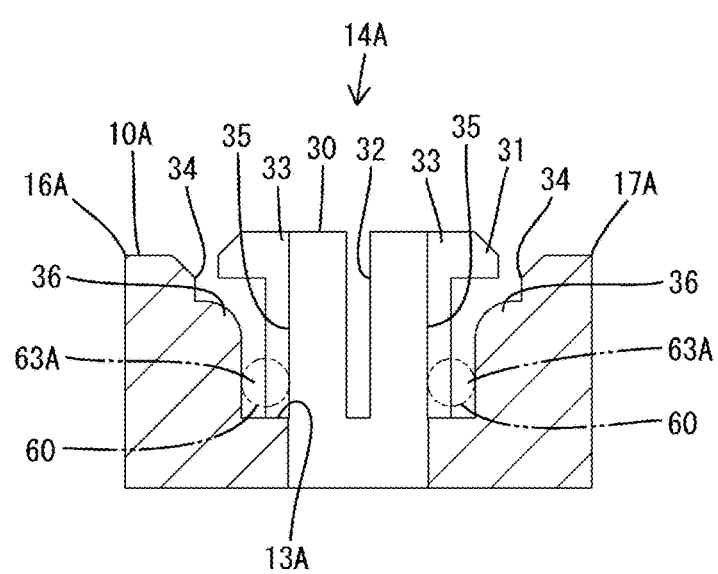
FIG. 11 is a cross-sectional view along a line C-C in FIG. 10.

FIGS. 10 and 11 show a second embodiment of the present disclosure. In a wiring structure according to the second embodiment, electrical wires 60 are directly positioned and fixed by a positioning/fixing portion 14A of a wiring member 10A, without using a coupling member. Unlike in the first embodiment, each positioning/fixing portion 14A is configured without a positioning recessed portion 19. The second embodiment is similar to the first embodiment except that the second embodiment is not provided with a coupling member and that the configuration of each positioning/fixing portion 14A is different.

The wiring member 10A has a wiring surface 13A that is flat, and a pair of side walls 16A and 17A stand upright on the wiring surface 13A. The two side walls 16A and 17A are arranged so as to be parallel with each other. A lead-out port 23A for electrical wires 60 is provided at an end edge of the wiring member 10A, between the two side walls 16A and 17A.

The positioning/fixing portion 14A has an electrical wire winding portion 30 that stands upright on the wiring surface 13A at a position that is between the two side walls 16A and 17A and is in the vicinity (slightly inside) of the lead-out port 23A. The electrical wire winding portion 30 is formed so as to have a cylindrical shape overall. Dividing grooves 32 that are centered about a hollow shaft core portion and form a cross shape in plan view are provided in the electrical wire winding portion 30 so as to span the entire height thereof. The electrical wire winding portion 30 is divided by the dividing grooves 32 into four electrical wire holding pieces 33 arranged in a circumferential direction, and each of these individual electrical wire holding pieces 33 is bendable in a radial direction. As shown in FIG. 11, insertion ports 34 for electrical wires 60 are respectively open between the upper end of the electrical wire winding portion 30 and the side wall 16A and between the upper end of the electrical wire winding portion 30 and the side wall 17A.

Also, flanges 31 are provided at the upper end of the electrical wire winding portion 30 such that each flange 31 protrudes in a radial direction. The flanges 31 are respectively formed on the electrical wire holding pieces 33 of the electrical wire winding portion 30 such that each flange 31 has an arc shape in plan view, specifically, the shape of an arc corresponding to a quarter of a circle in a plan view. Also, each flange 31 protrudes toward an insertion port 34 to narrow the width of the opening of the insertion port 34. Therefore, when the electrical wire winding portion 30 is in a natural state, each insertion port 34 has an opening width smaller than the outer diameter of a set of electrical wires 60, between a flange 31 and the side wall 16A or 17A. Note that the flanges 31 and the side walls 16A and 17A define the insertion ports 34 using inclined surfaces that are inclined downward.

The inner surfaces of the two side walls 16A and 17A are each provided with a mound portion 36 that is thicker than the surrounding portions and is located so as to face a body portion 35 of the electrical wire winding portion 30 (a portion of the electrical wire winding portion 30 excluding the flanges 31). The body portion 35 of the electrical wire winding portion 30 and each mound portion 36 are located at a distance that is substantially equal to the outer diameter of a set of electrical wires 60.

At the time of assembly, a set of electrical wires 60 are lowered toward the wiring surface 13A of the wiring member 10A via an insertion port 34. When the set of electrical wires 60 passes through the insertion port 34, the outer circumferential surfaces of the set of electrical wires 60 slides along the side wall 16A or 17A and flanges 31, and thus electrical wire holding pieces 33 are bent inward in a radial direction due to a dividing groove 32. As a result, the opening width of the insertion port 34 increases, and the electrical wires 60 are allowed to pass therethrough.

Upon being inserted into the insertion port 34, the electrical wires 60 are bent so as to have a loop shape, and after passing through the insertion port 34, the electrical wires 60 are wound around the outer circumferential surface of the body portion 35 of the electrical wire winding portion 30 once. At this time, considering the protruding length of led-out portions 64A that are led out of the lead-out port 23A, the sections to be wound, of the electrical wires 60, are determined so as to be located between the electrical wire winding portion 30 and the ends of the electrical wires 60 to which a connector 70 is to be connected.

The routing-target portions 63A of the electrical wires 60 are sandwiched between the body portion 35 of the electrical wire winding portion 30 and the mound portions 36 in a state of being routed on the wiring surface 13A (see FIG. 11). At this time, the electrical wires 60 are pressed against the inner surfaces of the mound portions 36 with a strong force due to an elastic restoring force generated as a result of the electrical wires 60 being wound around the electrical wire winding portion 30, and thus the electrical wires 60 are positioned and fixed by the positioning/fixing portion 14A. Also, due to the electrical wire holding pieces 33 elastically returning to the original shapes thereof, the opening width of each insertion port 34 is reduced, and the flanges 31 are located above the electrical wires 60 so that the electrical wires 60 can be locked. As a result, it is possible to prevent the electrical wires 60 from coming out of the insertion ports 34, and it is possible to desirably keep the electrical wires 60 in a state of being wound around the electrical wire winding portion 30.

As described above, according to the second embodiment, electrical wires 60 are wound around an electrical wire winding portion 30 and are directly positioned and fixed by the positioning/fixing portion 14A. Therefore, there is no need to use a coupling member, and as a result, it is possible to reduce the number of parts.

Other Embodiments

The following briefly describes other embodiments.

The coupling member holding pieces may be omitted from the first embodiment.

The flanges and the dividing grooves may be omitted from the second embodiment.

The band insertion portions may be omitted from the first embodiment.

In the first embodiment, the coupling member is not limited to a band member as long as it can be fixed to the outer circumferential surface of a set of electrical wires. For example, the coupling member may be a fixing member such as a clip that is fixed to the outer circumferential surface of a set of electrical wires, or a piece of tape wound around the outer circumferential surface of a set of electrical wires many times.

In the second embodiment, electrical wires may be wound around the electrical wire winding portion twice or more.

The invention claimed is:

1. A wiring structure comprising:
  a wiring member that is made of resin and has a wiring surface; and
  an electrical wire that includes a portion routed along the wiring surface and a portion led out from the wiring member, the portion led out having an end portion to which a connector is to be attached,
  wherein a positioning/fixing portion is provided integrally with the wiring member at a position in the vicinity of a lead-out position on the wiring surface of the wiring member, the electrical wire being led out from the lead-out position,
  the wiring structure further comprises a band member that includes a band body portion that is wound around an outer circumferential surface of the electrical wire, and a base portion that has a lock hole through which the band body portion is inserted and that locks the band body portion, and
  the positioning/fixing portion has an insertion space that is located inside walls that stand upright on the wiring surface and into which the base portion is fitted, and has a coupling member holding piece that stands upright and extends in a top-bottom direction from the wiring surface side and a slit is disposed between the coupling member holding piece and a side wall so as to make the coupling member holding piece bendable so as to pivot about the wiring surface side, and a standing end of the coupling member holding piece is provided with an anti-separation protrusion that is claw-shaped and protrudes toward the insertion space.

2. A wiring structure comprising:
  a wiring member that is made of resin and has a wiring surface; and
  an electrical wire that includes a portion routed along the wiring surface and a portion led out from the wiring member, the portion led out having an end portion to which a connector is to be attached,
  wherein a positioning/fixing portion is provided integrally with the wiring member at a position in the vicinity of a lead-out position on the wiring surface of the wiring member, the electrical wire being led out from the lead-out position, and
  the positioning/fixing portion has an electrical wire winding portion that stands upright on the wiring surface, an insertion port through which the electrical wire is inserted toward the electrical wire winding portion, and an electrical wire holding piece that is bendable and from which a flange protrudes toward the insertion port.

* * * * *